US006731656B1

(12) United States Patent
Slater et al.

(10) Patent No.: US 6,731,656 B1
(45) Date of Patent: May 4, 2004

(54) COMMUNICATION SYSTEM

(75) Inventors: Iain J Slater, Nottingham (GB);
Laurence Arden, Nottingham (GB)

(73) Assignee: Marconi Communications Limited, Coventry (GB)

( * ) Notice: Subject to any disclaimer, the term of this patent is extended or adjusted under 35 U.S.C. 154(b) by 0 days.

(21) Appl. No.: 09/419,414

(22) Filed: Oct. 15, 1999

(30) Foreign Application Priority Data

Oct. 16, 1998 (GB) ............................................. 9822547

(51) Int. Cl.$^7$ .................................................. H04J 3/04
(52) U.S. Cl. ...................................... 370/536; 370/477
(58) Field of Search ............................... 370/536, 537, 370/477, 539, 541, 464–467

(56) References Cited

U.S. PATENT DOCUMENTS

| | | | | |
|---|---|---|---|---|
| 5,550,876 A | * | 8/1996 | Urbansky | 370/516 |
| 5,617,417 A | | 4/1997 | Sathe et al. | |
| 5,706,285 A | * | 1/1998 | Saijonmaa et al. | 370/230.1 |
| 6,160,819 A | * | 12/2000 | Partridge et al. | 370/474 |
| 2002/0041604 A1 | * | 4/2002 | Ferguson | 370/466 |

FOREIGN PATENT DOCUMENTS

| | | |
|---|---|---|
| EP | 0 436 292 A2 | 7/1991 |
| WO | PCT/GB97/00521 | 2/1997 |
| WO | WO 97/33398 | 9/1997 |

OTHER PUBLICATIONS

Dumortier, P., et al., *Transport of Gigabit ATM Cell Streams Over Lower Order SDH Backbone*, Proceedings of the Conference on Computer Communications (INFOCOM), Toronto, Jun. 12–16, 1994, Los Alamitos, IEEE Comp. Soc. Prss, US., vol. 2, Jun. 12, 1994, pp. 1160–1167.
Transport of Gigabit ATM Cell Streams Over Lower Order SDH Backbone, P. Dumortier, et al., *INFOCOM '94, Networking for Global Communications, 13$^{th}$ Proceedings IEEE*, pp. 1160–1167, vol. 3, Jun. 12–16, 1994.

* cited by examiner

*Primary Examiner*—Wellington Chin
*Assistant Examiner*—Raj Jain
(74) *Attorney, Agent, or Firm*—Kirschstein, etal.

(57) ABSTRACT

A communications system utilizes, inverse multiplexing to transfer wide band signals over a plurality of narrow band links. To enable efficient use of the available links, incoming data whether or not cell or packet based, is inverse multiplexed in a byte format regardless of packet boundaries into virtual containers. Overhead signals are generated to enable the original data to be reassembled at the receiving end.

8 Claims, 4 Drawing Sheets

Principle of Inverse Multiplexing

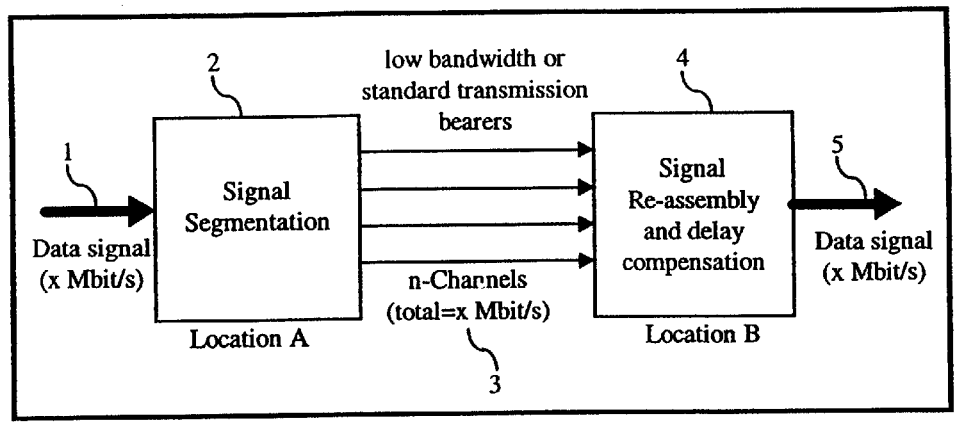
Figure 1 Principle of Inverse Multiplexing
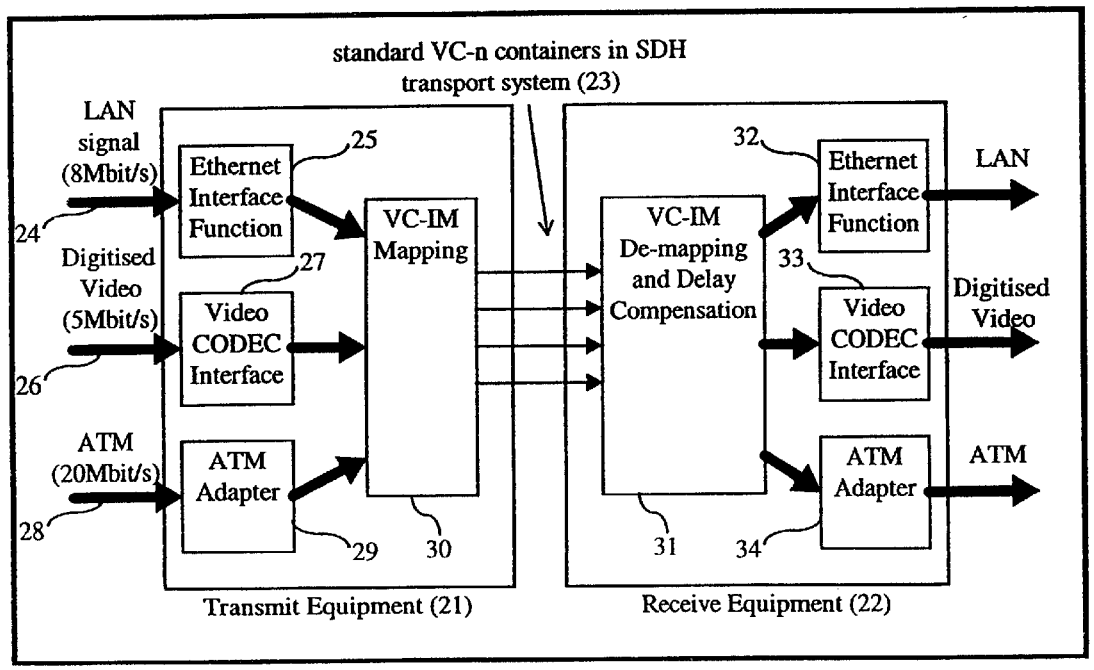
Figure 2 Examples of VC-IM carrying Broadband Signals over an SDH Network

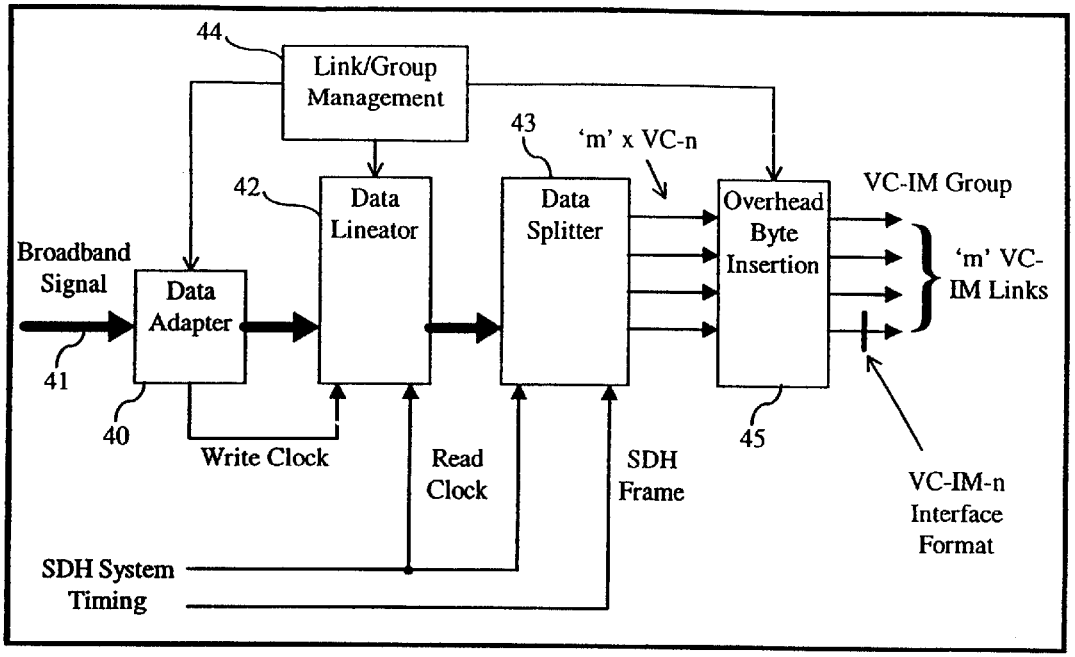
Figure 3    VC-IM Transmit Function
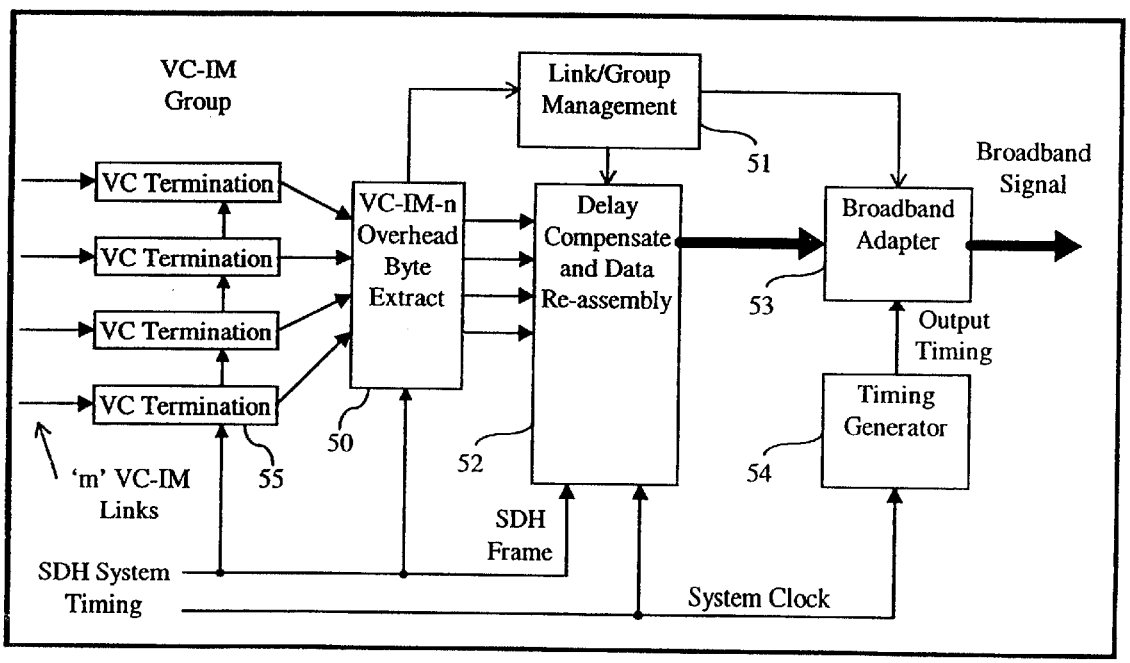
Figure 4    VC-IM Receive Function

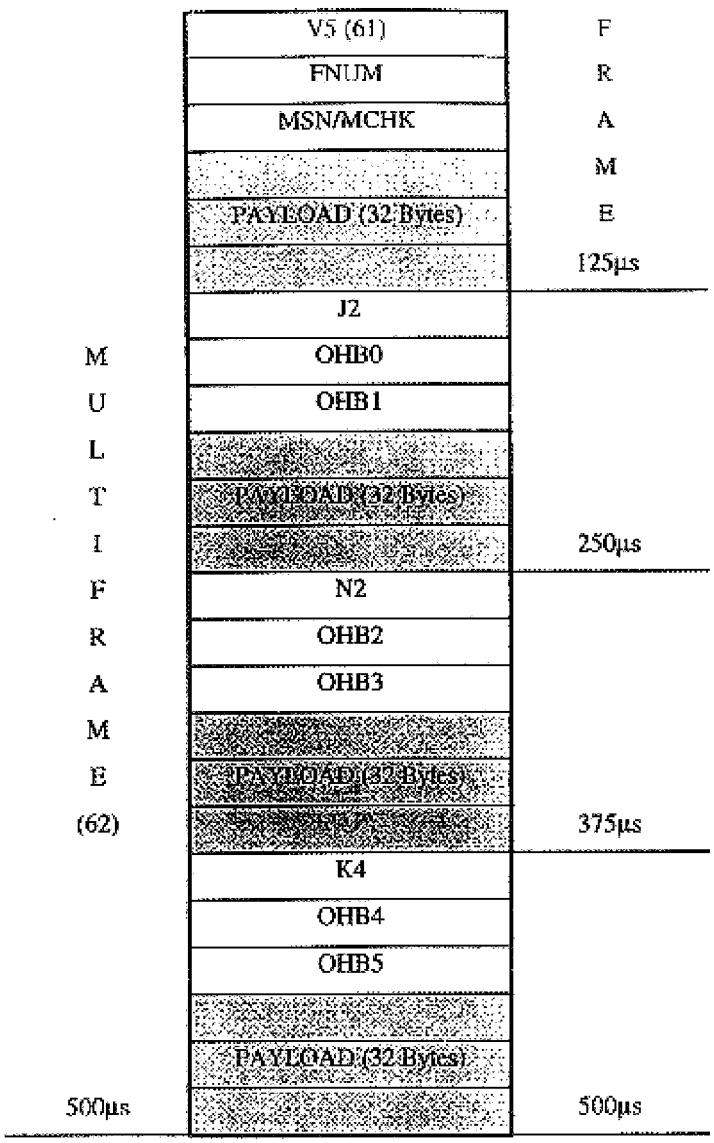

Figure 5   VC-IM-12 Interface Signal Format

| Overhead Frame No. | OHB0 | OHB1 | OHB2 | OHB3 | OHB4 | OHB5 |
|---|---|---|---|---|---|---|
| 0 | GID | LID | LSI | Reserved | Reserved | Reserved |
| 1 | MSGB0 | MSGB1 | MSGB2 | MSGB3 | MSGB4 | MSGB5 |
| 2 | MSGB6 | MSGB7 | MSGB8 | MSGB9 | MSGB10 | MSGB11 |
| 3 | MSGB12 | MSGB13 | MSGB14 | MSGB15 | Reserved | Reserved |
| 4 | GID | LID | LSI | Reserved | Reserved | Reserved |
| 5 | MSGB16 | MSGB17 | MSGB18 | MSGB19 | MSGB20 | MSGB21 |
| 6 | MSGB22 | MSGB23 | MSGB24 | MSGB25 | MSGB26 | MSGB27 |
| 7 | MSGB28 | MSGB29 | MSGB30 | MSGB31 | Reserved | Reserved |

Figure 6   VC-IM Overhead Superframe Structure

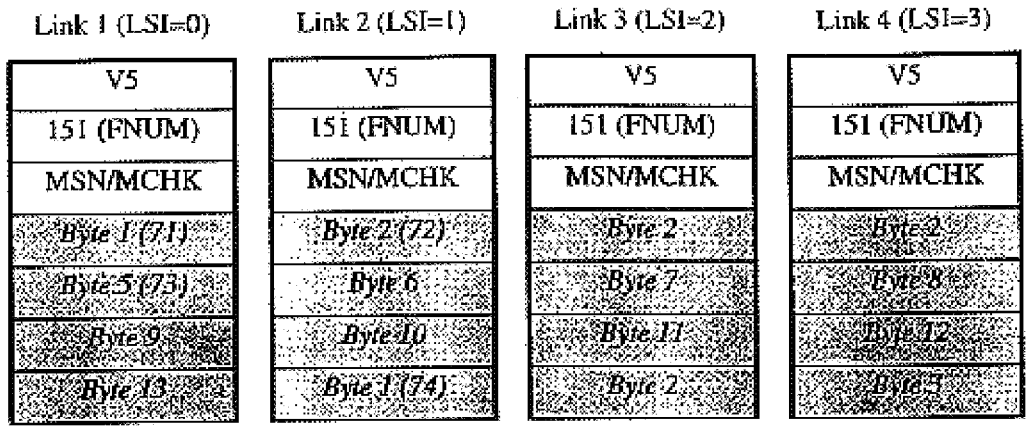
Figure 7    VC-IM-12 Mapping Sequence at Transmitter
Figure 8    VC-IM-4 Interface Signal Format (125μs)

"COMMUNICATION SYSTEM

BACKGROUND OF THE INVENTION

This invention relates to a communication system in which broadband data signals are transported across a synchronous digital hierarchy network (SDH).

The choice of digital transmission bearers within telecommunication networks has widened over the past decade with the emergence of new standards. The Plesiochronous Digital Hierarchy (PDH) which offered standard interface rates such as 1.544 Mbit/s, 2.048 Mbit/s, 34.368 Mbit/s and 139.468 Mbit/s has now been superseded by the Synchronous Digital Hierarchy (SDH). SDH has been designed to carry signals with PDH interface rates by 'mapping' them into virtual containers and, in fact, the majority of interfaces on contemporary SDH equipment are at PDH rates. This 'mapping' feature also allows for future signal types to be transported across SDH networks in parallel with legacy signal types. Provision has also been made within SDH for increasing bandwidths of signals while remaining compatible with existing equipment.

Both PDH and SDH systems fall into the broad category called Time Division Multiplex (TDM) equipment as they have been optimized to carry signals which have a constant, uninterrupted stream of data bits. As a consequence of this optimization, traditional voice traffic can be transported at a variety of capacity levels with reasonable efficiency. In contrast data-type signals, which are predominantly packet based, suffer from transport inefficiencies when carried over SDH and PDH systems. A major cause of this inefficiency is when a suitable container size does not exist for the bandwidth of the chosen packet rate.

Inverse multiplexing is a method for transporting non-standard or higher bit-rate signals over existing lower bit-rate communications channels or bearers. By carefully matching the number of lower-rate channels used for inverse multiplexing with the required packet rate an efficient data transport system can be constructed using TDM equipment. Inverse multiplexing is particularly suited to the handling of Asynchronous Transfer Mode (ATM) traffic, and a method has been devised (called IMA) for inverse multiplexing ATM cells into low capacity PDH signals by breaking up and re-constructing the broadband ATM signal on a cell-by-cell basis. Subsequently, these PDH signals may be mapped into an SDH transport system resulting in a 2-stage process with unnecessary signal processing whenever IMA is to be carried over SDH. Furthermore, it is difficult to apply the IMA method to other types of broadband data signal since the control and communication mechanism used by IMA relies on the presence of ATM cells.

SUMMARY OF THE INVENTION

The present invention seeks to provide an improved communications by utilizing the Inverse Multiplex method in a manner which is more suitable and more efficient for SDH transport systems and which is compatible with existing SDH equipment.

According to this invention a communications system having an SDH path between two nodes in which the path has virtual containers of a predetermined bandwidth, including at one node, means for receiving data including packet based data having a bandwidth greater than said predetermined bandwidth, and means for inverse multiplexing said data in a byte format regardless of packet boundaries onto a plurality of virtual containers for transmission to said other node; means at the other node for receiving and reassembling said data; and means for compensating for delays caused by the different path lengths of individual virtual containers.

The communications system is suitable for a wide range of broadband data types and can compensate for the specific timing impairments introduced by the SDH transport system.

As is known, a virtual container is a logical entity that exists only in a Synchronous Transport Module (STM), and contains both overhead information and pay load data. Different types of virtual containers have been defined by International Standards bodies to incorporate: the size and structure of each container; the type of payload data and method for encoding the timing of data; use of overhead bytes for management and maintenance purposes. Current virtual container (VC-n) types include VC-12, VC-2, VC-3 and VC-4. This invention proposes a method for using existing virtual containers to transport a new inverse multiplex mapping denoted as VC-IM-n. The use of byte mapping enables the original digital content of the signal and its phase/frequency properties to be accurately preserved without the excessive use of bandwidth which would be required by an ATM cell based system.

BRIEF DESCRIPTION OF THE DRAWINGS

The invention is further described by way of example with reference to the accompanying drawings in which:

FIG. 1 is an explanatory diagram relating to inverse multiplexing;

FIG. 2 illustrates one embodiment of the invention;

FIG. 3 illustrates the transmit aspect of the invention in greater detail;

FIG. 4 illustrates the receive aspect of the invention in greater detail, and

FIGS. 5, 6, 7 and 8 are explanatory diagrams.

DETAILED DESCRIPTION OF THE PREFERRED EMBODIMENTS

The principle of inverse multiplexing is shown in FIG. 1, in which a relatively broadband data signal is to be transmitted over a network having bearer channels each of narrower bandwidth. A number of these bearer channels are allocated so that together they can accommodate the broadband data.

Thus the incoming data signal 1 having a bandwidth of X Mbit/s is applied to a signal segmentation unit 2, which splits the signal into a number of separate narrowband signals, each typically 2 Mbit/s, for transmission over n-channels 3 to unit 4 at which the signals are reassembled. Since the transmit time of all the channels 3 will not generally be the same, unit 4 re-times the incoming signals, and compensates for the various relative delays in each channel 3. The original signal is thereby reconstituted and output as output data signal 5. Such an inverse multiplexing technique is used when it is necessary to send individual data signals over existing telecommunication circuits which have a relatively narrow bandwidth capacity.

FIG. 2 shows diagrammatically an embodiment of the invention, in which signals are to be transmitted from Equipment 21 to Equipment 22 via an SDH transmission system which is organized to carry data in virtual containers (VC) 23, each typically having a standard bandwidth of 2 Mbit/s.

Equipment 21 is shown having three types of input signal, although in practice other data rates and other input signal types will also be received. A LAN signal 24 having a bandwidth of 8 Mbit/s is received at an Ethernet interface 25, a Digitized video signal 26 having a bandwidth of 5 Mbit/s is received at a video CODEC interface 27, and an ATM signal 28 having a bandwidth of 20 Mbit/s is received at an ATM adapter 29. Thus, data can be received in byte, cellar packet format. The three types of signal are mapped on a byte basis by a VC-IM (Virtual Container-Inverse Multiplexing) unit 30, the function of which is described in greater detail with reference to FIG. 3.

In essence unit 30 transforms the incoming wideband signals into 2 Mbit/s streams each of which is carried by a virtual container through the transport system 23 to equipment 22, where unit 31 acts to de-map the virtual containers and apply compensation for relative delays introduced by the various transmission paths over which the individual virtual containers have travelled.

When de-mapped, the original signals are reformed and passed via respective interface units 32, 33 and 34 to be output as a LAN, Digitized video and an ATM signal, as the case may be. By mapping the input signals on a byte basis into virtual containers using an inverse multiplexing technique, efficient use of the available SDH bandwidth results, and it is not necessary to modify intermediate nodes of the SDH network. As is explained subsequently the method used to segment the originating signal into sequential bytes and then to re-assemble the original data stream is optimized for transport of data signals within an SDH system and incorporates compensation for the differential path delay experienced by each VC as well as preserving the timing characteristics of the broadband signal.

The VC-IM transmit function as represented by the Transmit Equipment 21 is shown in FIG. 3 for a particular input signal type, in this instance assumed to be packet or cell based. A data adapter function 40 is used to terminate the data packets or cells in the broadband signal 41 and to perform any routing functions associated with packet or cell addresses. Packets or cells which can arrive at the data adapter 40 at irregular intervals are converted into a continuous data stream within a data lineator 42. The process used to produce a constant stream of data is largely standardized and is defined elsewhere; for example, with ATM signals a method exists for introducing idle cells between cells which carry actual data.

The constant data stream from the data lineator is then segmented into 8-bit bytes by the data splitter 43 without any regard to the packet or cell boundaries. Each subsequent byte of data is then inserted into each one of the 'm' VC-n links in turn, i.e., in a 'round-robin' manner. In order to keep track of the byte sequence a three-level sequence numbering scheme is used. This scheme can be examined in more detail by considering the case of a VC-IM-12 mapping as shown in FIG. 5: The data splitter 43 constructs the 500 $\mu$s multiframe format of the standard SDH VC-12 container with a VC-12 Path Overhead (POH) consisting of V5, J2, N2 and K4 bytes. This structure ensures compatibility when each VC-IM-12 link is carried in existing SDH networks. The overhead byte insertion function 45 makes use of spare SDH overhead slots to insert new bytes specific to the VC-IM mapping including: Frame Number Indicator (FNUM) which will be described in more detail below; Message Number (MSN) and Message Check (MCHK) byte which indicates that a new communications message has been received; 6 Multiframe Overhead Bytes (OHB0–OHB5) which are detailed in FIG. 5.

The first level of sequence numbering utilizes the TU-12 pointer, which is part of the standard mapping process for a VC-12. The TU-12 pointer defines the position of the V5 byte 61 within the VC-IM-12 multiframe 62 to which all the other bytes in the multiframe maintain a constant relative position. As a result, the sequence of the 128 payload bytes into which the data is mapped is clearly defined within each VC-IM-12.

The second level of the sequence numbering scheme involves the use of the Link Sequence Identifier (LSI) byte within the overhead superframe (FIG. 6). The overhead superframe has a structure that is repeated with every 8 VC-IM-12 multiframes (FIG. 5) and contains: Group ID (GID) and Link ID (LID) values used by the management system to label and trace the network connections of VC-IM groups; 32 Messaging Bytes (MSGB0–MSGB31) which are used to carry communication and control messages between the two ends of a VC-IM-12 connection; an LSI Byte. At the transmitter each of the 'm' VC-12 links which make up the VC-IM-12 group are given a unique LSI number which identifies the 'round-robin' sequence used to insert bytes into successive VC-12s.

An example of the combined effect of levels 1 and 2 of the byte sequence numbering at the output of a VC-IM-12 transmitter is shown in FIG. 7 for a group with 4 links and a data packet size of 13 bytes. The first payload byte of the first link 71 contains the Byte 1 of the data stream; the first payload of the second link 72 contains Byte 2 of the data stream until Byte 5 of the data stream is inserted into the second payload byte of the first link 73. This continues until Byte 13, whereafter Byte 1 of the next data packet (or stuffing data if no new packet is available) is mapped into the fourth payload byte of the second link 74. The LSI value carried in the Overhead Superframe is indicated against each link in FIG. 7.

In the case of a VC-IM-4 mapping a similar overhead structure exists (FIG. 8), containing an LSI byte, with the second level of sequence numbering being contained within the AU-4 pointer associated with the VC-4. Further VC-IM-n mapping formats, corresponding to other SDH container rates (e.g. VC-2 and VC-3) shall be similar to either the VC-IM-12 or the VC-IM-4 format.

The third level of the sequence numbering scheme uses the FNUM value shown in FIGS. 5, 7 and 8. The overhead byte insertion function 45 adds a cyclic numbering byte in the FNUM position such that its decimal value increments from 0 to 255 in consecutive multiframes (VC-IM-12) or frames (VC-IM-4). When the value of FNUM reaches 255 the next multiframe/frame contains an FNUM value of 0 which then continues to increment as before. The value of FNUM transmitted in all links belonging to the same group are aligned, as shown by the 'example' value of '151' in each link in FIG. 7, but can differ when they arrive at the receiver due to differences in path delay for each VC-IM-12 link.

At the receive end of the VC-IM-n connection, shown in FIG. 4 the original data signal is re-constructed from the incoming VC-n Links. The re-constructing process is primarily a matter of identifying the original sequence of data as encoded using the three-level sequence numbering scheme and in so doing compensating for different delays which occur on the separate links. The normal mechanisms for de-multiplexing the SDH VC-n signal are performed in the VC Termination function 55 for each individual VC. For example, for a VC-12 signal this involves: interpreting the TU-12 pointer to determine the position of the V5 byte; recovering the V5, J2, N2 and K4 overhead bytes; performing management functions based on the values of these overhead bytes. Once the TU or AU pointer has located the start of the VC-IM-n frame (e.g. FIG. 5 and FIG. 8) the second level of sequence decoding can be carried out. This involves accessing the VC-IM-n overhead bytes in overhead byte extract unit 50 in order to extract the LSI byte values and the FNUM values. The Overhead Byte Extraction unit 50 also routes the 32-byte messages contained in the MSGBn bytes to the Link/Group Management unit 51. The Link/Group management function shall send and receive communications to the transmit end regarding the status of the group and thus control the VC-IM data transfer mechanism. The extracted LSI and FNUM are used simultaneously to re-order the SDH frame-synchronized bytes entering the Delay Compensation and Data Re-assembly unit 52 to produce a datastream leaving 52 in which bytes with a lower FNUM value exit first and bytes with the same FNUM value but a lower LSI number exit first. A data store is incorporated in 52 to store the number of bytes associated with the maximum delay between the slowest and fastest links in the group. This simple re-ordering mechanism will always preserve the integrity of the byte sequence so long as the delays are not greater than +/−(FNUMMAX/2) VC-IM-n frames. At VC-12 this corresponds to a data store which can hold a minimum of (128×FNUM/2×N) bytes where N is the number of links in the group. The reconstructed broadband signal is then converted at adapter 53 into the appropriate interface format, depending on the signal type being transported over the VC-IM connection, and a re-timing function provided by Timing Generator 54 uses the SDH system clock to generate the phase/frequency properties of the outgoing broadband signal.

A VC-IM-n Group requires appropriate connection, shown in FIG. 1, of the VC-n channels 3 across the network. This may be performed independently to the management of the VC-IM function, using existing SDH network management functions. The Overhead Superframe (FIG. 6) includes a 32 byte messaging signal to communicate additional end-to-end VC-IM-n configuration information. This messaging signal can be used to communicate between the two ends of the system when coordinating a dynamic change to the size of the VC-IM group, such as the addition of an extra Link or the removal of an existing Link in response to changing traffic demands. By using SDH-type overheads in this way to manage the VC-IM Group a flexible management system is achieved which can either be integrated into the current SDH network management function or can be managed by a separate controller which accesses equipment at each end of the VC-IM-n path, if the intermediate SDH equipments are unable to recognize the VC-IM-n overheads.

We claim:

1. A communication system having a synchronous digital hierarchy path between two nodes, the path having virtual containers of a predetermined bandwidth, they system comprising: means at one of the nodes, for receiving input data including packet based data having a bandwidth greater than said predetermined bandwidth, and means for inverse multiplexing said data in a byte format regardless of packet boundaries onto a plurality of the virtual containers for transmission to the other of the nodes; means at the other node, for receiving and reassembling said data; means for compensating for delays caused by different path lengths of individual virtual containers, said plurality of virtual containers being in a phase relationship; and means at the one node, for inserting into each virtual container overhead bytes which are indicative of the phase relationship.

2. The system as claimed in claim 1, wherein successive bytes are inserted in turn into each of the virtual containers for transmission to the other node.

3. The system as claimed in claim 1, wherein the plurality of virtual containers which carry data derived from a given input broadband data signal includes the overhead bytes to so identify such containers to facilitate reassembly of said data signal.

4. The system as claimed in claim 3, and means for utilizing a three level sequence numbering system to track a sequence of the overhead bytes, one level utilizing a TU or AU pointer to identify a reference byte, a second level using an LSI number to identify a repeating sequence of virtual containers, and a third level using a frame number indicator (FNUM) for identification of differing path delays.

5. The system as claimed in claim 4, and means at the other node, for reordering data utilizing LSI and FNUM, whereby the bytes having a lower FNUM value exit first, and the bytes with the same FNUM value but a lower LSI number exit before those with a higher LSI number.

6. The system as claimed in claim 1, and the one node being adapted to receive a plurality of input data streams, each having a different bandwidth and signal format.

7. The system as claimed in claim 6, and means for increasing or reducing a number of the virtual containers associated with transport of a particular input data stream in dependence upon changes in a type and/or bandwidth of input data which is received.

8. The system as claimed in claim 1, wherein the virtual containers have differing bandwidths.

\* \* \* \* \*